United States Patent [19]

Bush et al.

[11] Patent Number: 5,015,816
[45] Date of Patent: May 14, 1991

[54] RESISTANCE WELDING ELECTRODE AND PROCESS

[75] Inventors: Arden W. Bush, Trafalger; Everett E. Shirley, Lebanon, both of Ind.

[73] Assignee: CMW, Inc., Indianapolis, Ind.

[21] Appl. No.: 410,823

[22] Filed: Sep. 26, 1989

Related U.S. Application Data

[63] Continuation-in-part of Ser. No. 260,196, Oct. 20, 1988, Pat. No. 4,954,687.

[51] Int. Cl.⁵ .............................................. B23K 11/30
[52] U.S. Cl. .................................. 219/119; 219/117.1
[58] Field of Search ...................... 219/117.1, 119, 120

[56] References Cited

U.S. PATENT DOCUMENTS

| | | | |
|---|---|---|---|
| 2,138,338 | 11/1938 | Platz . | |
| 2,322,101 | 6/1943 | Winlock et al. | 219/4 |
| 2,389,945 | 11/1945 | Wisler | 219/4 |
| 3,363,086 | 1/1968 | Eckland et al. | 219/119 |
| 4,045,644 | 8/1977 | Shafer et al. | |
| 4,588,870 | 5/1986 | Nadkani et al. | 219/119 |

FOREIGN PATENT DOCUMENTS

| | | |
|---|---|---|
| 0120431 | 10/1984 | European Pat. Off. . |
| 921821 | 7/1949 | Fed. Rep. of Germany . |
| 1938548 | 2/1970 | Fed. Rep. of Germany . |
| 2424093 | 12/1979 | France . |
| 8004012 | 9/1980 | France . |
| 155239 | 12/1980 | German Democratic Rep. . |
| 63-80983 | 4/1988 | Japan . |

OTHER PUBLICATIONS

Basic Welding Theory for Welding Galvanize and Coated Steel; Author: The Electroroy Co., Inc.; 4 pp.
Sheet Metal Welding Conference II, American Welding Society–Detroit Section Oct. 27–29, 1986 in Dearborn, Michigan; 9 pp.
Standard Resistance Welding Products, CMW Inc. 1988; Advances in Resistance Spot and Seam Welding of Zinc–Coated Steel Strip; Author: F. J. Ganowski and N. T. William.
Non dressing Dispersion Strengthened Copper Electrode Designs for Galvanized Steel Welding; Authors: M. D. Assel and A. V. Nadkarni.
"Engineering Data Series 1100", Cat No. 23 © CMW Inc., 1982.
Standard for Automotive Resistance Spot Welding Electrodes, American Welding Society, Society of Automotive Engr. Inc.
Williams, N. T., "Recent Developments in the Resistence Welding of Zinc Coated Steels," *Welding and Metal Fabrication*, Jun. 1977, pp. 275–288.
Bowers, R. J. and Eager, T. W., "Non–Uniform Current Distribution in Spot Welding", AWS Conf., American Welding Society, Dearborn, Mich., Oct. 1986.

*Primary Examiner*—Clifford C. Shaw
*Attorney, Agent, or Firm*—Woodard, Emhardt, Naughton, Moriarty & McNett

[57] ABSTRACT

Resistance welding electrodes and processes using the same are provided. The electrodes have a base portion and an integral nose portion projecting therefrom, with the nose portion terminating in a welding tip face. The nose portion tapers inwardly between said base portion and said welding tip face with a concave profile taper such as a frustum of a vortical surface. The electrodes used may be made up of a conventional copper material having copper combined with one or more metals selected from the group consisting of chromium, zirconium, cadmium, cobalt, nickel, beryllium, tungsten, aluminum, tungsten carbide, iron, and molybdenum; or, may be made of essentally pure copper. The electrodes may be used in a welding process, which provides for a generally linear increase in current stepping with reduced or eliminated conditioning of the electrodes. The welding tip face has a convex curvature which may range between about a two inch and a eight inch radius of curvature, and which preferably has a radius of curvature of about four inches. Both male and female electrodes may be used with cooling recesses in the electrodes as well as an offset nose portion. The diameter of the welding tip face may be about equal to the length of the nose portion.

26 Claims, 6 Drawing Sheets

RESISTANCE WELDING ELECTRODE AND PROCESS

REFERENCE TO RELATED APPLICATIONS

This application is a continuation-in-part of our co-pending patent application Ser. No. 260,196, filed Oct. 20, 1988, now U.S. Pat. No. 4,954,687.

BACKGROUND OF THE INVENTION

The present invention relates to resistance welding electrodes and processes using welding electrodes, and more specifically to improved electrodes having selected shapes and welding current characteristics.

Resistance welding is a process used to permanently join metals such as steel sheet or other stock by typically pressing the stock together between a pair of electrodes, and then passing an electrical current from one electrode through the metal stock and into the other electrode. The electrical current involved is sufficiently high to cause sufficient heat due to electrical resistance to partially and momentarily melt the mating (or faying) surfaces of the metal stock at this point. In addition to this heat, sufficient pressure is applied to the stock by the welding tip faces of the electrodes to fuse the sheets of steel or other stock at this point into what is commonly called a weld nugget. Over time, this repeated heating and pressing operation causes breakdown, softening, mushrooming and other deformation of the electrodes. As this occurs, current requirements increase with the enlarged welding tip face contacting the stock until ultimately, replacement is required.

Furthermore, the steel being welded today is often galvanized, or coated with a zinc or other softer metal coating. This is especially true, for example, in the automotive industry. Under the heat and pressure of welding, this coating will tend to push aside and collect and also alloy with the electrodes which are typically a copper based metal. Both interfere with the welding process, but the alloying tends to compound the problems even more by further softening and increasing the electrical resistance at the surface thereby speeding up the breakdown and deformation of the electrodes. Due to the cost of replacing and/or refacing worn electrodes, it is the continuing desire of industry to increase the operational life of a resistance welding electrode at a reasonable cost. It is also the desire to minimize the electrical energy required to form a weld from both a cost and safety standpoint.

In a paper entitled NON-UNIFORM CURRENT DISTRIBUTION IN SPOT WELDING written by R. J. Bowers and T. W. Eagar of M.I.T., presented in Oct. of 1986 at the AWS's conference in Dearborn, Mich., the problem of electrode wear was addressed. Using finite element analysis, current density in different geometries of welding electrodes was computer modeled. The authors indicated that an optimal welding electrode geometry exists which balances two competing mechanisms of wear: uniform current distribution and mechanical/thermal stiffness. The suggested geometry, in FIG. 12 of the paper, is an electrode with a body portion, a nose portion having a welding tip face, and a concave, radiused taper from the welding tip face to the outer circumference of the electrode. The paper also concludes that electrode sheet interface angles approaching 90 degrees provide more uniform current distributions at the electrode face. However, the paper deals primarily with theory of geometric shapes, and focuses only on certain aspects of electrode design without addressing each of the many considerations in making a practical electrode, such as material selection.

As to material selection for such electrodes, this is addressed in U.S. Pat. No. 4,588,870 to Nadkarni et al., using a generally similar electrode shape to that disclosed in the M.I.T. paper above. In the Nadkarni '870 patent, it was demonstrated that conventional materials such as copper alloyed or otherwise combined with chromium, zirconium, cadmium, cobalt, nickel, beryllium, tungsten and/or molybdenum clearly cannot be used very well with the electrode shape disclosed in that patent. Such conventional copper alloys are reported to be severely softened by the high temperature, resulting in rapid mushrooming. In testing such copper alloys, Nadkarni '870 disclosed that on the 243rd weld both electrodes stuck badly to the galvanized steel and pulled off the adapters thereby evidencing failure. Instead, Nadkarni '870 indicates that success was obtained if the electrodes are formed of dispersion-strengthened copper rather than any of the conventional copper alloys.

However, dispersion-strengthened copper may require an extra fabricating step to cold form or upset the metal, and is quite expensive, typically several times the cost of conventional alloys. Accordingly, it is highly desirable to provide a welding electrode which takes advantage of the current density properties of electrodes as theoretically discussed in the M.I.T. paper while avoiding the difficulties of dispersion-strengthened copper caps and composite caps as required in the Nadkarni '870 patent. The present invention provides such a solution.

For example, dispersion-strengthened copper electrodes typically require significant conditioning early in the form of multiple runs before production welds can be made and before they attain any semblance of the desired generally-linear relationship between the number of welds and the weld current required. By reviewing the tables of the Nadkarni '870 patent, for early welds the rate of increase in weld current is fairly high for its electrodes up to about 500 welds. Only after this conditioning does the rate of increase in weld current tend to level out to a more linear function with a flatter slope.

It is a significant commercial desire to eliminate this need for preproduction conditioning of electrodes, and to have electrodes which exhibit a generally-linear weld current relationship throughout their life. This would be of significant value to industry, as welders could then make quality welds from the beginning without wasting production time conditioning each set of electrodes for several hundred welds. Also, welders are "stepped", or in other words, operated by increasing the electrical current amperage across the electrodes incrementally as the number of welds performed by the electrodes increases. During the life of the electrodes, they wear and may mushroom, resulting in an increasing surface area of the welding tip face as the number of total welds increases. Current stepping is done to maintain a generally constant current density at the welding tip face of the electrode by increasing the current to proportionally correspond to the increasing surface area of the welding tip face. Thus, stepping is used to maintain a generally constant current density. Unfortunately, with some prior electrodes, to maintain a generally constant current density suitable for welds, the rate of increasing current is not constant. However, the present invention provides a substantially-linear rate of increase of weld current, and thus it is easier for the operator to follow the optimal rate of current stepping thereby extending electrode life and reducing production costs.

The present invention provides these benefits. It reduces the amount of current required over more conventional electrodes for a given weld nugget, thus allowing energy savings and smaller welding equipment thereby reducing capital costs and space requirements which in turn may lead to more automation and reduced utility installation costs. Electrode life is extended as well, reducing replacement and/or refacing costs for electrodes. These advantages are provided while preferably avoiding the high cost of dispersion-strengthened copper. Also, the weld current characteristics of the invention are significantly improved, and provide for more uniform current stepping in welding processes to extend electrode life and improve operator efficiency.

These benefits are realized by a selected combination of electrode shapes, electrode metallurgy and electrical current stepping processes. In addition to the use of a concave profile taper such as that set forth in the M.I.T. paper discussed above, the present invention utilizes a specially-shaped welding tip face. More particularly, the welding tip face is fabricated within a selected range of convex curvatures which differ significantly in function and effectiveness from those disclosed in the Nadkarni '870 patent. Accordingly, contrary to the teachings of that patent, the present invention enables more conventional, less expensive copper alloys or copper to be used successfully and greatly reduces or eliminates the need for electrode conditioning experienced with dispersion-strengthened copper. Also, the present invention provides a self-dressing function by mushrooming in a controlled manner. The present invention also provides a more linear weld current function which is continuously stepped up as welding progresses, thus providing a significant advance in the art.

SUMMARY OF THE INVENTION

According to one embodiment, a resistance welding electrode is provided which comprises an electrically-conductive metal body having a base portion, means for cooling the body, and an integral, axially offset nose portion projecting from the base portion and terminating in a welding tip face, wherein the nose portion tapers inwardly between the base portion and the welding tip face with a concave profile taper, and wherein the welding tip face is fabricated to define a convex welding tip curvature having a general curvature between about a two-inch and an eight-inch radius of curvature.

The invention also provides a process for welding metal members together, comprising the steps of pressing the steel members together between a pair of the resistance welding electrodes as defined above; and passing an electric current through the electrodes and through the metal members to weld the members together.

The invention further provides for simplified conditioning of welding electrodes for welding coated metal into a series of weld joints.

The invention provides these advantages using low cost conventional copper alloys. Also, the present invention may be used with essentially pure copper which has been found especially useful in welding aluminum.

Accompanying objects of the invention are to provide an improved resistance welding electrode and process incorporating a particularly advantageous electrode geometry and utilizing a conventional copper alloy while eliminating the need for pre-conditioning and reducing overall costs while increasing operator efficiency and electrode life. These and related objects will be apparent in view of the present disclosure.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated devices and processes, and such further applications of the principles of the invention as illustrated therein being contemplated as would normally occur to one skilled in the art to which the invention relates.

Referring to FIGS. 1A, 1B, 1C, 1D, and 3, a first embodiment of the present invention is shown. Electrode body 125 is a resistance welding electrode designed to be mounted on electrode holders, as is known and disclosed in the Resistance Welding Products catalog of the Assignee of the present invention, CMW, Inc. of Indianapolis, Ind., such catalog hereby being expressly incorporated by reference. Electrode body 125 has base portion 127 and nose portion 129. Base portion 127 has a base length $L_1$; nose portion 129 has an axial nose length $N_1$. Body 125 has cooling recess 131 therein and adapted for cooling fluids such as, for example, water. Cooling recess 131 may have a variety of shapes. Nose portion 129 projects from base portion 127 and terminates in an integrally fabricated welding tip face 133. Welding tip face 133 may be fabricated from a variety of methods such as cold forming, but often is machined on a lathe. The same is true for the rest of the electrode. Concave profile 135 lies between welding tip face 133 and base portion 127, ending at shoulder 137 in the illustrated embodiment. Accordingly, nose portion 129 tapers inwardly between base portion 127 and welding tip 133 with a concave profile taper 135. Note that the present invention, including the base portion, may comprise a full sized electrode with a shaft as well as the electrode caps illustrated in the drawing figures. More specifically, concave profile 135 may define a frustum of a vortical surface, appearing somewhat like a trumpet, and in the preferred embodiment, concave profile 135 has a concave curvature of an arc of a circle. The concave radius of curvature of the concave profile may vary. However, in the first embodiment of the electrode of the present invention illustrated, concave profile 135 has a curvature of an arc of a circle with a one quarter inch radius. Furthermore, the welding tip face diameter $C_1$ is likewise about 0.25 inches. In the first embodiment, axial nose length $N_1$ is about a quarter of an inch long. Accordingly, welding tip face diameter $C_1$ and axial nose length $N_1$ are about equal in length in the preferred embodiment. These dimensions are typically used when electrode 125 has a base diameter $D_1$ of about five eighths of an inch.

Figures 1A, 1B:
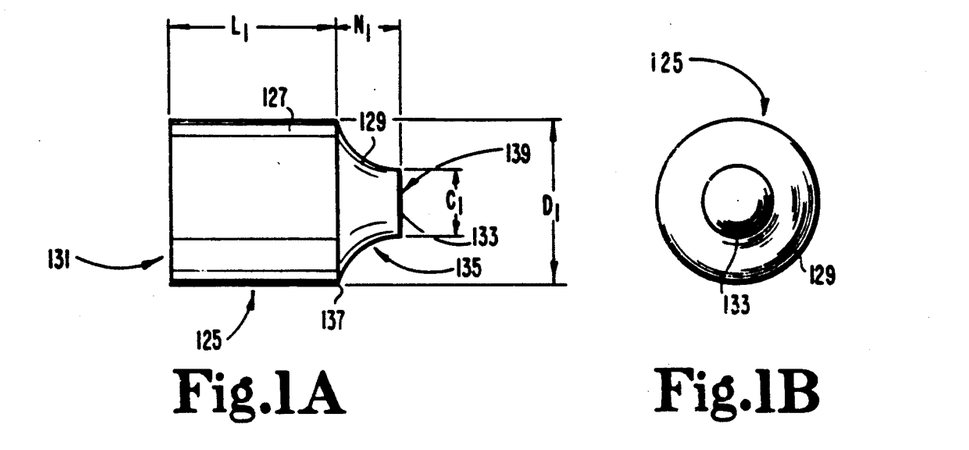
FIG. 1A is a side view of a first embodiment of a female electrode according to the present invention.
FIG. 1B is a front view of the electrode of FIG. 1A.
Figures 1C, 1D:
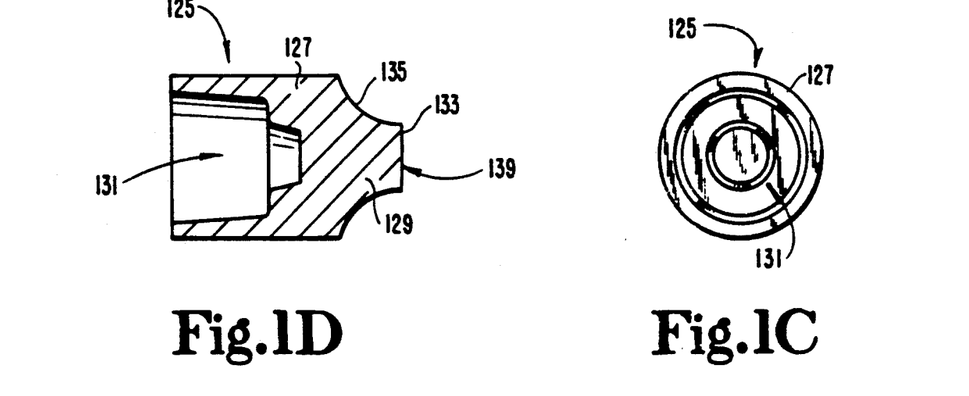
FIG. 1C is a rear view of the electrode of FIG. 1A.
FIG. 1D is a side view in full section of the electrode of FIG. 1A.

Various other dimensions may be used. For example, base diameter $D_1$ may equal three quarters of an inch. In such embodiment, typically welding tip face diameter $C_1$ is nine thirty-seconds of an inch, axial nose length $N_1$ is 0.35 inches, base length $L_1$ is 0.65 inches, and the concave radius of curvature defining concave profile 135 is a radius of about ⅜ inch. These dimensions may vary while being within the scope of the present invention. Furthermore, concave profile 135 does not necessarily have to be defined by the arc of a circle, but may have a variety of other curvatures or incremental linear segments.

Figure 3:
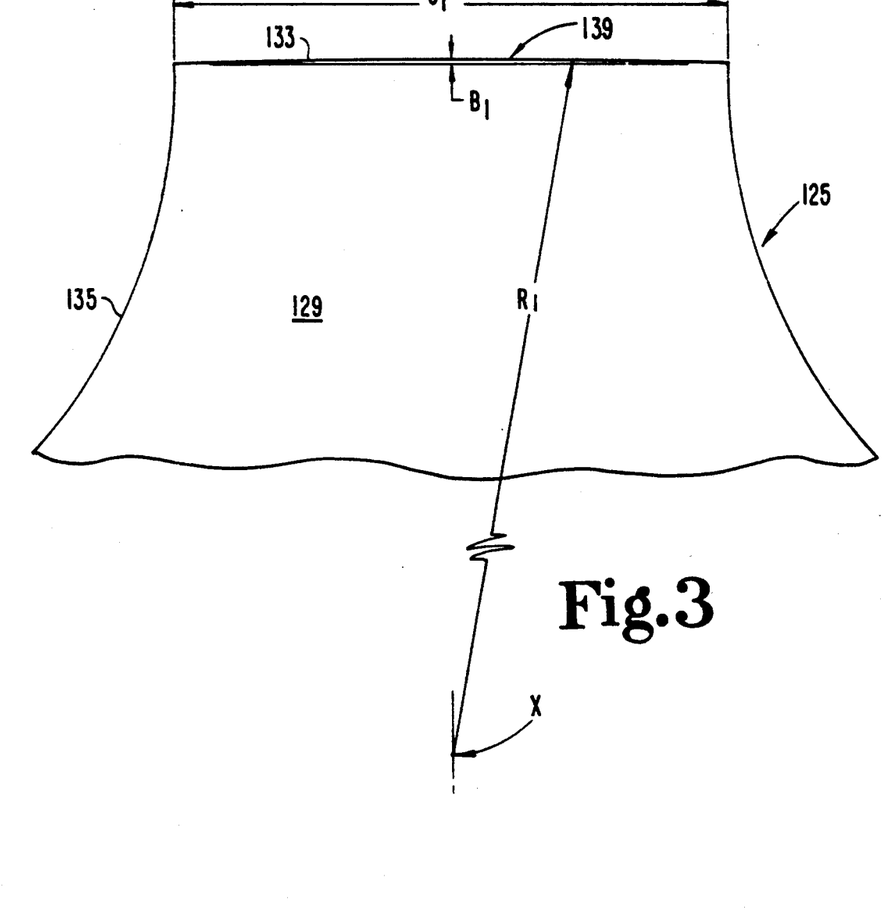
FIG. 3 is a side detail view of a portion of the first embodiment of an electrode according to the present invention.
Figure 4:
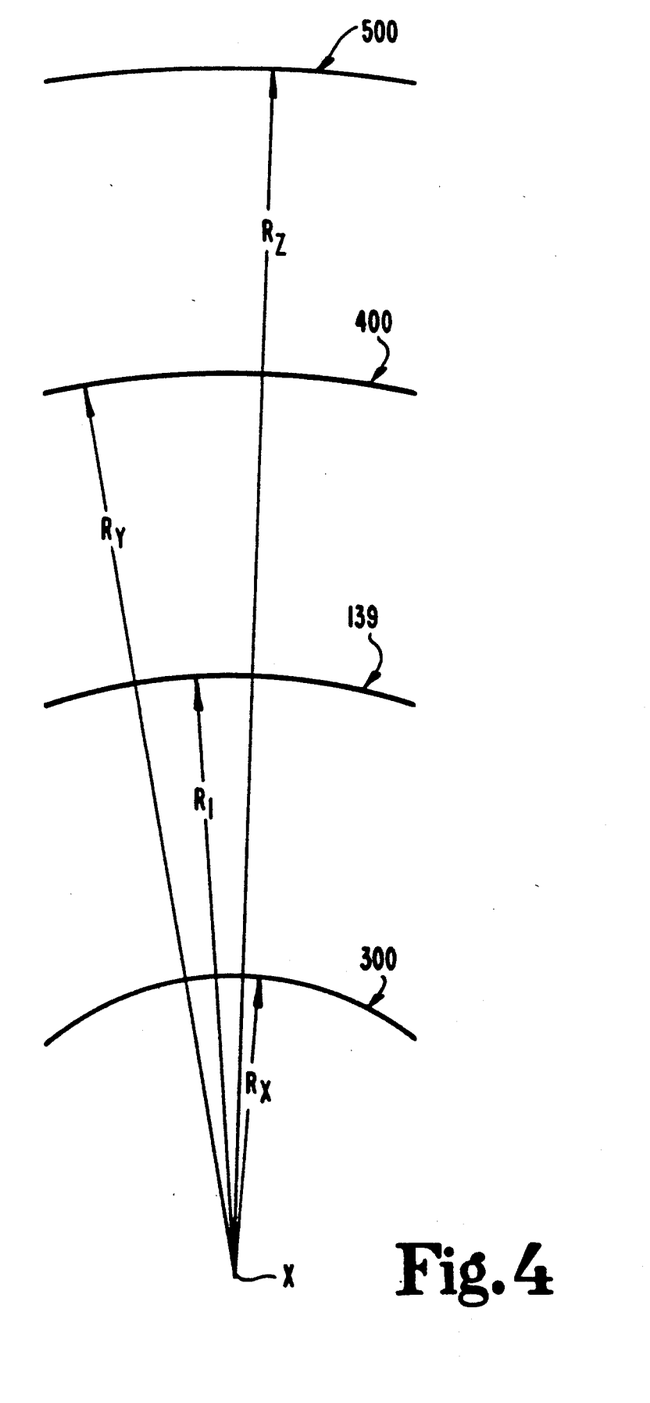
FIG. 4 is a diagram showing the welding tip face curvature of the first embodiment of an electrode according to the present invention within a range of convex radiuses of curvature.

Welding tip face 133 has a convex welding tip curvature 139. Thus, welding tip face 133 forms a crown or a slight dome above an imaginary planar surface defined by the perimeter of face 133. Referring specifically to FIGS. 3 and 4, convex welding tip curvature 139 may be defined by a convex radius of curvature $R_1$. In the present invention, radius of curvature $R_1$ is a radius of curvature falling between two inches and eight inches, and preferably is about four inches in length. As illustrated in FIG. 4, radius of curvature $R_1$ is four inches taken from center of curvature X to convex welding tip curvature 139. This four inch radius of curvature falls between the two inches radius of curvature $R_X$ (defining two inch curvature 300) and eight inch radius of curvature $R_Z$ (defining eight inch curvature 500). Curvature 139 also falls between the two inch radius of curvature $R_X$ and six inch radius of curvature $R_Y$ (defining six inch curvature 400). As illustrated in FIG. 4, convex welding tip curvature 139 forms a sharper curvature than six inch curvature 400, whereas two inch curvature 300 forms an even sharper curvature than curvature 139. Six inch curvature 400 is sharper than both curvature 500 and a flat surface which would theoretically be defined by an infinite radius of curvature.

As illustrated in FIG. 3, electrode 125's nose portion 129 has a welding tip face diameter $C_1$. Convex welding tip curvature 139 of welding tip face 133, which, as illustrated, is defined by convex radius of curvature $R_1$ taken from center of curvature X, and face diameter $C_1$ define crown height $B_1$. The mathematical relationship of a convex radius of curvature R, a welding tip face diameter C (which forms a chord of a circle), and a crown height B is defined by the mathematical equation:

$$B = R - \tfrac{1}{2}\sqrt{4R^2 - C^2}$$

Accordingly, for the first embodiment of the present invention where $R_1$ equals four inches, and where $C_1$ equals one quarter inch, crown height $B_1$ is mathematically calculated to be 0.00195 inches taken at the axial center of welding tip face 133. In fact, due to fabricating controls, crown height $B_1$ is more like 0.0019 or 0.002 inches. Although machining is typically used to fabricate the curvature, other processes such as cold forming can be used, particularly with sophisticated cold forming machines. The tolerances for curvature 139, and more particularly for crown height $B_1$, may vary. However, for an electrode, such as electrode 125, with a curvature defined by radius $R_1$ of about four inches and a crown height $B_1$ of about 0.002 inches, an acceptable tolerance for crown height $B_1$ is believed to be about +0.001 and −0.0005. Thus, this gives a range for crown height $B_1$ for such an electrode of about 0.003 inches to about 0.0015 inches. Curvature 139, and curvature 239 discussed below, are set forth to be general curvatures within the range of about a two inch and a eight inch radius of curvature. Such general curvature encompasses curvatures which, for a selected part of their curvature surface, fall outside of the two inch to eight inch range or form a slight cusp, if overall, the average effective curvature on the welding tip face falls within that range, affording the benefits of the present invention. Such general convex curvature functions to allow the concave profiled shape to be used with conventional copper alloys and combinations without undue sticking and without excess conditioning. Such curvatures may include noncircular curvatures, such as third order curves, although circular curves are preferred due to machining considerations.

Referring now to FIGS. 2A, 2B, 2C and 2D, a second embodiment of the present invention is shown. The primary difference between the second embodiment and the first embodiment is that the second embodiment is a male electrode, as is known in the trade by virtue of male projection 241, whereas the first embodiment is a female electrode. Electrode 225 has base portion 227 and nose portion 229. Base portion 227 includes male projection 241 and has cooling recess 231 therein. Nose portion 229 projects from base portion 227 and terminates in an integrally fabricated welding tip face 233. Nose portion 229 tapers inwardly between base portion 227 and welding tip face 233 with a concave profile 235 taper, similar to that described with the first embodiment. Shoulder 237 is provided. Alternatively, shoulder 237, like shoulder 137, may be rounded off (not shown) if desired.

Figure 2A:
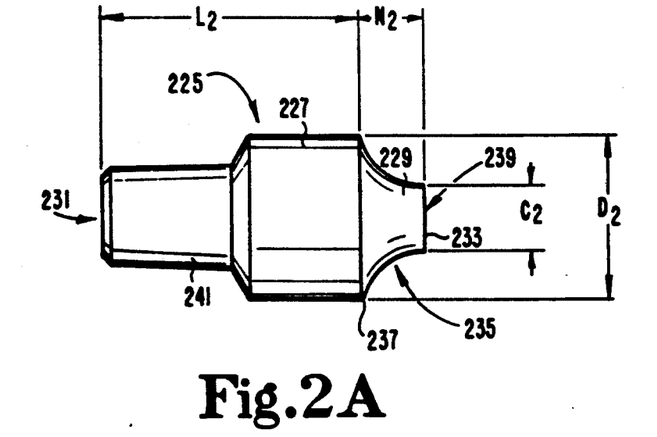
FIG. 2A is a side view of a second embodiment of a male electrode according to the present invention.
Figure 2B:
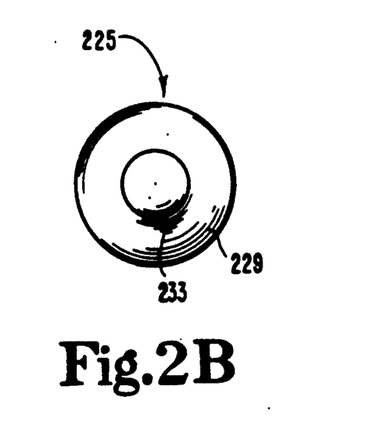
FIG. 2B is a front view of the electrode of FIG. 2A.
Figure 2C:
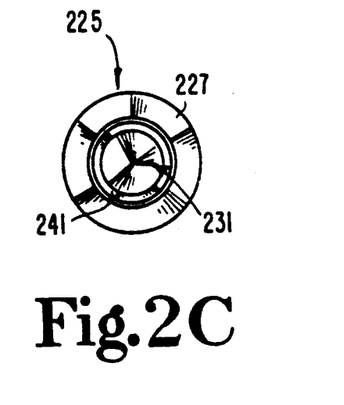
FIG. 2C is a rear view of the electrode of FIG. 2A.
Figure 2D:
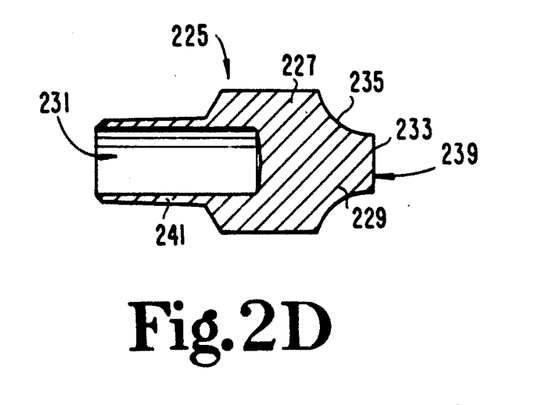
FIG. 2D is a side view in full section of the electrode of FIG. 2A.

Welding tip face 233 has convex welding tip curvature 239 which is structurally and functionally similar to convex welding tip curvature 139 previously described. As such, convex welding tip curvature 239 preferably generally falls between a radius of curvature of two inches and a radius of curvature of eight inches, and preferably has a radius of curvature of about four inches. However, the present invention is effective with a radius of curvature of about nine inches and beyond where the crown height functionally serves to prevent sticking during early welds.

The dimensions of electrode 225 may vary, but include base diameter $D_2$, axial nose length $N_2$, base length $L_2$, and welding tip face diameter $C_2$. These dimensions may be similar to the female embodiment previously described with the exception that typically base length $L_2$ is longer than base length $L_1$ due to the presence of male projection 241. For example, base length $L_2$ is preferably about 1¼ inch where base diameter $D_2$ is ⅝ inch. As is known, male projection 241 provides a male fitting for insertion into an electrode holder, whereas female electrodes typically receive a male portion from the electrode holder. Nose portion 229 has a concave profile 235 similar to concave profile 135 previously described, and preferably is a frustum of a vortical surface having a trumpet-like shape.

Referring now to FIGS. 7A, 7B, 7C, 7D, 7E and 7F, a third embodiment of the present invention is shown. The primary difference between the third embodiment and the first embodiment is that the third embodiment has a nose portion which is axially offset from the base portion, whereas the first embodiment (and the second embodiment) nose portion is axially centered with respect to the base portion. Specifically, electrode 725 has nose portion 729 axially offset from base portion 727. Note that although electrode 725 is a female electrode, this offset embodiment may also be provided in a male electrode version (not shown) having a male projection similar to male projection 241 described with respect to the second embodiment above.

Electrode 725's base portion 727 has cooling recess 731 therein. Nose portion 729 projects from base portion 727 and terminates in an integrally fabricated welding tip face 733. Nose portion 729 tapers inwardly between base portion 727 and welding tip face 733 with a concave profile 735 taper, similar to that described with the first embodiment although corresponding to the offset geometry as illustrated. Specifically, in the illustrated third embodiment, concave profile 735 is a circular curvature having a radius $C_3'$ (see FIGS. 7E and 7F) which is equal or about equal to the welding tip face diameter $C_3$ (see FIG. 7A). This concave profile 735 is preferably maintained constant radially around the perimeter or welding tip face 733. Since in the illustrated embodiment, welding tip face diameter $C_3$ is one-half of the base diameter $D_3$, and since the radius of curvature of concave profile 735 is equal to welding tip face diameter $C_3$, shoulder 737 formed near the top side of base 727 is about ninety degrees at this point, and furthermore, nose length $N_3$ is approximately equal to welding tip face diameter $C_3$. Although these curvatures and dimensions may vary with respect to each other while still performing the self-dressing and structural support functions of the present invention, it is believed that a preferred range of ratios between the welding tip face diameter $C_3$ and the nose length $N_3$, is such that the nose length $N_3$ is somewhere between one-half and two times the welding tip face diameter $C_3$. These ratios (½:1 to 2:1) are likewise applicable to the previous embodiments already described, with the preferred ratio about 1:1. It is to be further noted that the absolute dimensions dictating the size of electrode 727 may vary depending upon the size of the weld nugget desired.

Figure 7A:
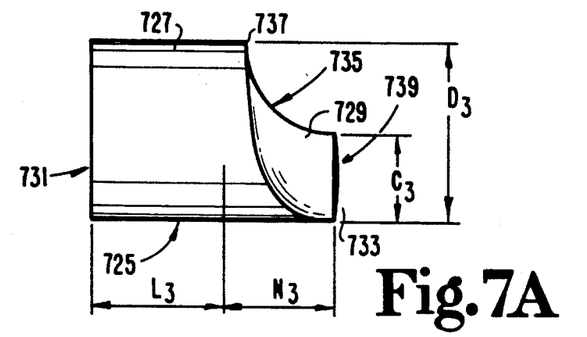
FIG. 7A is a side view of a third embodiment of a female electrode according to the present invention.
Figure 7B:
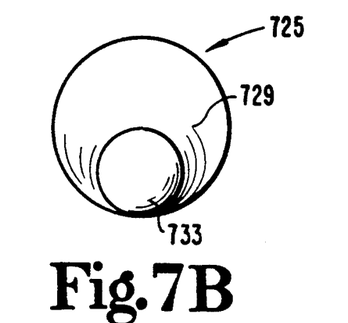
FIG. 7B is a front view of the electrode of FIG. 7A.
Figure 7C:
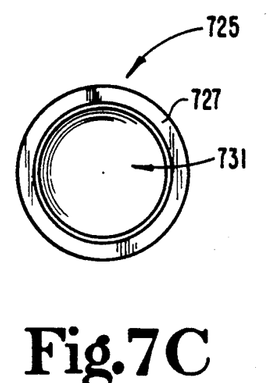
FIG. 7C is a rear view of the electrode of FIG. 7A.
Figure 7D:
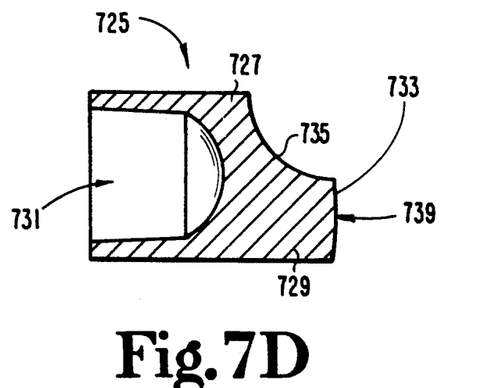
FIG. 7D is a side view in full section of the electrode of FIG. 7A.
Figure 7E:
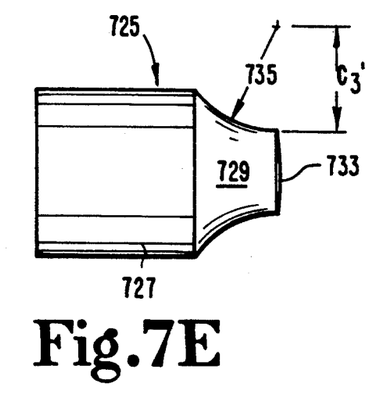
FIG. 7E is a top view of the electrode of FIG. 7A.
Figure 7F:
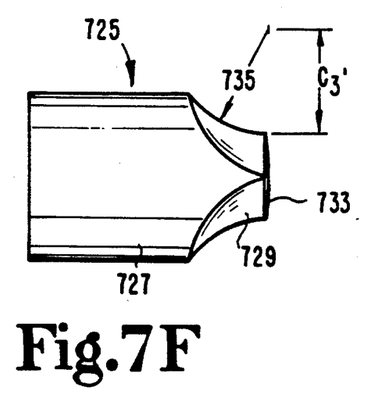
FIG. 7F is a bottom view of the electrode of FIG. 7A.

By way of example, electrode 725 as illustrated has the following dimensions. Base diameter $D_3$ is ⅝ths of an inch; welding tip face diameter $C_3$ is 5/16ths of an inch; nose length $N_3$ is 5/16ths of an inch; and base length $L_3$ is about 0.58 inches. Other examples include a base diameter of ⅝ths of an inch with a welding tip face diameter of ¼th of an inch; or, a base diameter of 0.482 inches with a welding tip face diameter of ¼th of an inch.

It is to be understood that welding tip face 733 has convex welding tip curvature 739 which is structurally and functionally similar to convex welding tip curvature 139 previously described. As such, convex welding tip curvature 739 preferably generally falls between a radius curvature of 2 inches and a radius of curvature of 8 inches. However, it has generally been found that quantification of this curvature may better be expressed in terms of the crown height (such as crown height $B_1$ illustrated in FIG. 3) ranging between about 0.003 inches and about 0.0015 inches, with the preferred value believed to be about 0.002 inches.

The metallurgy used for electrode body 125 or electrode body 225 or electrode body 725 may vary, but preferably is a conventional copper alloy. For example, such copper alloy may be copper alloyed or otherwise combined with one or more metals selected from the group consisting of chromium, zirconium, cadmium, cobalt, nickel, beryllium, tungsten, aluminum, tungsten carbide, iron, and molybdenum. Preferably, electrodes are made of a metal alloy marketed under the fanciful trademark CMW 3 which is an R.W.M.A. Group A, Class 2 alloy identified as 2.18200 having copper and chromium as the principal elements, offered by the Assignee of this patent application. Such alloy provides good weldability for zinc plated galvanized steel and is considerably less expensive than many other materials such as dispersion-strengthened copper. CMW 3 copper alloy material comprises from about 0.6% to 1.2% chromium, the balance essentially copper.

However, recent tests have shown that the electrodes of the foregoing shapes may alternatively be made of essentially pure copper, rather than a copper alloy. Such copper electrodes have been found to be especially satisfactory in welding aluminum, aluminum alloys or aluminum coated steel together, but may be used for other metals as set forth in this specification. Aluminim alloys may include for example manganese, magnesium, zinc, copper, silcone, titanium and vanadium. Such tests of welding aluminum have been made with electrodes according to the present invention with copper which is about 99.9% pure, and which is relatively soft (about 25 on the B scale for Rockwell hardness).

Optionally, a coating may be used on the welding tip face of the electrode. Electrode body 125 and electrode body 225 and electrode body 725 may be coated, particularly on their welding tip face, with a very thin coating of, for example, rhodium, zinc, graphite, titanium carbide, grease, soot, or another compound leaving a carbon based deposit. Other suitable coatings may be used within the scope of the present invention. Such coating, while not required, may further help avoid sticking in the very initial twenty or so welds. Presently, graphite has been tested and favorable results achieved even beyond the other advantages of this invention. Such graphite is applied to the welding tip face by pressing and turning the face against a block of graphite, leaving a thin residue of graphite on the face. The advantages of this coating remain even if a significant portion of the graphite is wiped from the welding tip face. Preliminary tests with graphite coating have started at about fourteen thousand amps and continued for about the first thousand welds with little or no current increase required for suitable welds.

Figure 5:
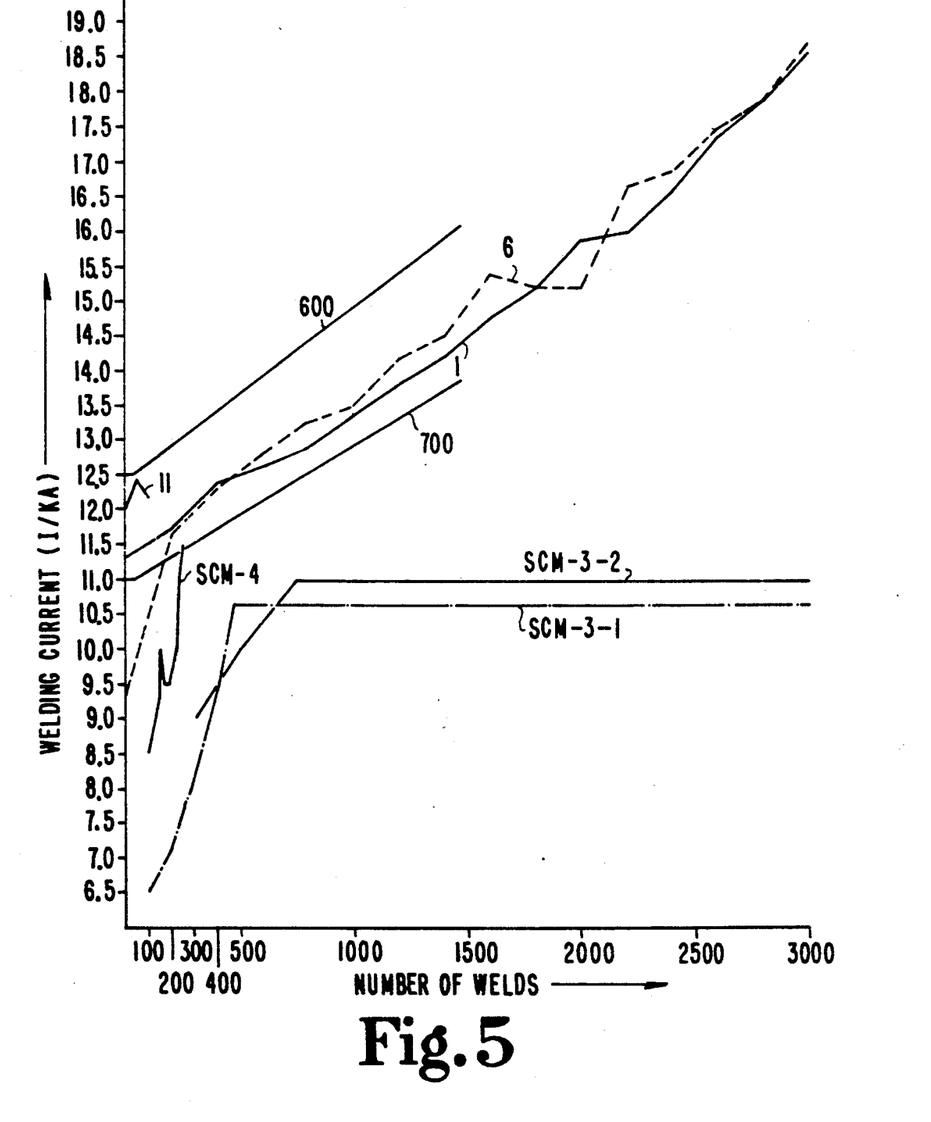
FIG. 5 is a graph plotting the welding current for a number of welds for selected resistance welding electrode designs.
Figure 6:
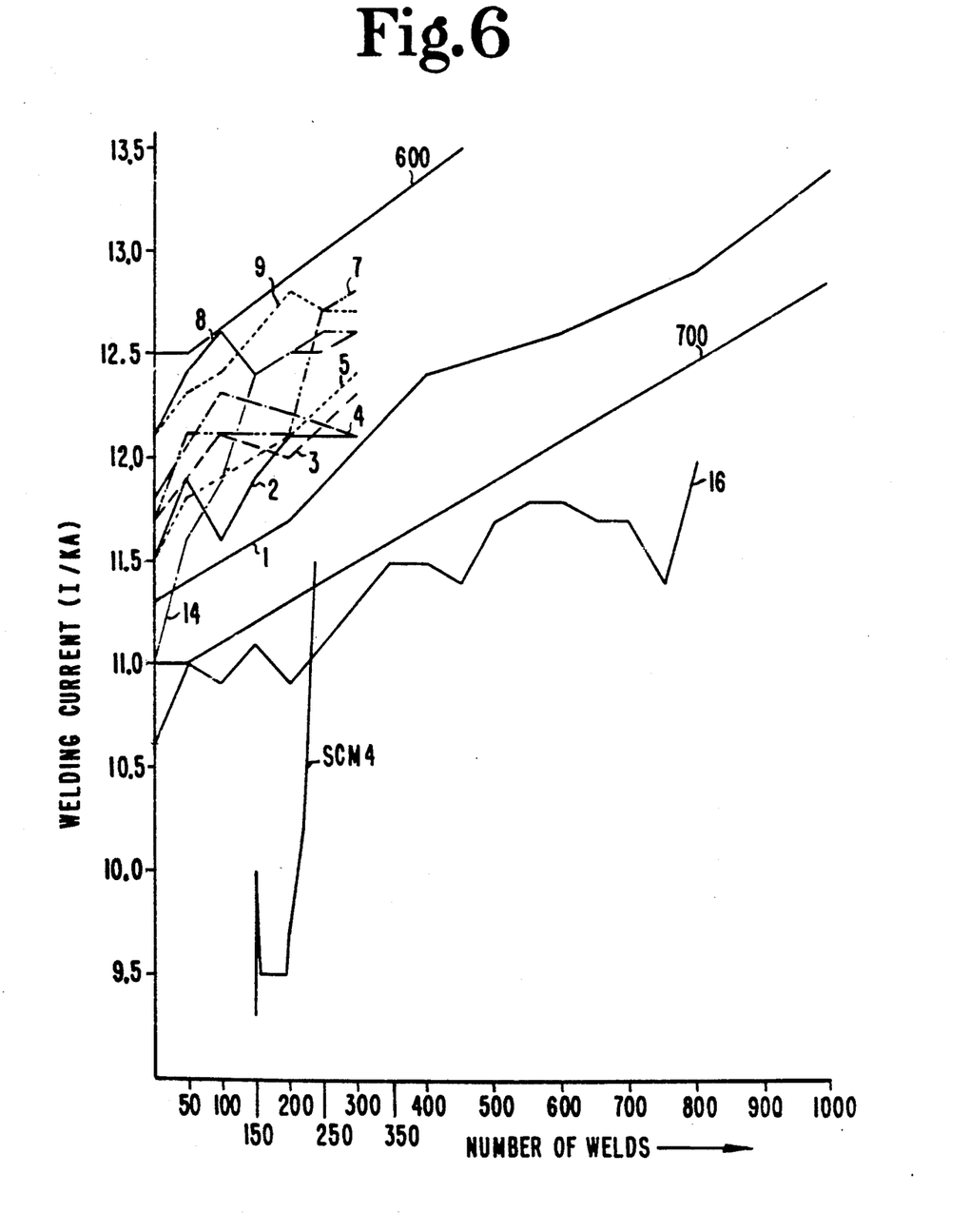
FIG. 6 is an enlarged graph plotting the welding current for a number of welds for selected resistance welding electrode designs.

The following Tables 1 and 2 and the corresponding key to Tables 1 and 2 set forth various selected tests of electrodes. The tables set forth current schedules for various test numbers showing for a given weld number the electrical current in thousands of amps (I/KA), and the weld nugget size in terms of inches (WN). Selected tests from these tables are plotted on the graphs of FIGS. 5 and 6. These graphs plot the number of welds versus the amperage, in kiloamps, showing a current schedule for an electrode. Also plotted on FIGS. 5 and 6 are selected current schedules based on data presented in the Nadkarni '870 patent discussed in the Background of the Invention. Note that the test conditions in the Nadkarni '870 patent do differ from the test conditions for the present invention, and accordingly, this should be considered when comparing the data.

The Tables reflect tests 1 through 16. Of these, the tests plotted on FIG. 5 are test nos. 1, 6, 11, and also the data from the Nadkarni '870 patent from table 3 therein (SCM-3-1, SCM-3-2) and from table 4 (SCM-4) rejecting a conventional copper alloy. The following tests are plotted on FIG. 6: test nos. 1, 2, 3, 4, 5, 7, 8, 9, 14, 16 and SCM-4.

The key to Tables 1 and 2 discloses for a given test number, the face radius R, the base diameter D, whether the electrode was male or female (with an axial centered nose), and the steel type in terms of thickness and galvanizing (i.e., 0.030 inches, G90 grade, commonly known). The spangle pattern was moderately large.

Each of these tests was conducted on electrodes having a concave taper profile nose portion, such as concave profile 135 or concave profile 235. Various face radiuses, or a convex radius of curvature R, were used to determine their current schedule.

The weld force used for tests was 800 lbs. The squeeze was 80 cycles and the hold time was 5 cycles. For several tests, current pulsation was used, as denoted as a weld cycle of, for example, "7-1-7" for power on for seven cycles, power off for one cycle, and power on for seven cycles. Tests 10, 11, 12, 13, 14, and 15 had a weld cycle of 11-1-11. The remainder of tests had a weld cycle of 7-1-7.

Welds were specified to be for 0.030" steel, a shear of 1100 pounds and a nugget size of 0.160" based on published handbook standards. If welds fell below specification, the current was adjusted. The tests are as follows:

| KEY TO TABLE NOS. 1 and 2 | | | | |
|---|---|---|---|---|
| TEST NO. | FACE RADIUS | BASE DIAMETER | MALE/ FEMALE | STEEL TYPE |
| 1 | 4" | ⅝" | Female | .030" G90 |
| 2 | 4" | ⅝" | Male | .030" G90 |
| 3 | 4" | ⅝" | Male | .030" G90 |
| 4 | 4" | ⅝" | Male | .030" G90 |
| 5 | 4" | ⅝" | Male | .030" G90 |
| 6 | 2" | ⅝" | Female | .030" G90 |
| 7 | 4" | ⅝" | Female | .030" G90 |
| 8 | 4" | ¾" | Female | .030" G90 |
| 9 | 4" | ¾" | Female | .030" G90 |
| 10 | 6" | ¾" | Female | .030" G90 |
| 11 | 6" | ¾" | Female | 030" G90 |
| 12 | 6" | ¾" | Female | .030" G90 |
| 13 | 6" | ¾" | Female | .030" G90 |
| 14 | 2" | ¾" | Female | .030" G90 |
| 15 | 2" | ¾" | Female | .030" G90 |
| 16 | 7" | ⅝" | Female | .030" G90 |

TABLE NO. 1

| | Test #1 | | Test #2 | | Test #3 | | Test #4 | | Test #5 | | Test #6 | | Test #7 | | Test #8 | |
|---|---|---|---|---|---|---|---|---|---|---|---|---|---|---|---|---|
| # Welds | I/KA | WN | I/KA | WN | I/KA | WN | I/KA | WN | I/KA | WN | I/KA | WN | I/KA | WN | I/KA | WN |
| 0 | 11.3 | .150 | 11.5 | .165 | 11.7 | .150 | 11.8 | .173 | 11.5 | .173 | 9.3 | .280 | 11.7 | .256 | 12.1 | .220 |
| 50 | | | 11.9 | .197 | 11.9 | .193 | | | | | | | 12.1 | .197 | 12.4 | .228 |
| 100 | | | 11.6 | .224 | 12.1 | .177 | 12.3 | .189 | 11.8 | .181 | | | 12.1 | .185 | 12.6 | .248 |
| 150 | | | 11.9 | .217 | | | | | | | | | 12.1 | .209 | 12.4 | .240 |
| 200 | 11.7 | .154 | 12.1 | .185 | 12.0 | .197 | 12.2 | .217 | 12.1 | .197 | 11.8 | .138 | 12.1 | .209 | 12.5 | .236 |
| 250 | | | | | | | | | | | | | 12.7 | .228 | 12.5 | .264 |
| 300 | | | 12.1 | .232 | 12.3 | .177 | 12.1 | .220 | 12.4 | .169 | | | 12.8 | .228 | 12.6 | .201 |
| 350 | | | | | | | | | | | | | | | | |
| 400 | 12.4 | .220 | | | | | | | 12.6 | .189 | 12.3 | .161 | | | | |
| 450 | | | | | | | | | | | | | | | | |
| 500 | | | | | | | | | | | | | | | | |
| 550 | | | | | | | | | | | | | | | | |
| 600 | 12.6 | .224 | | | | | | | | | 12.8 | .201 | | | | |
| 650 | | | | | | | | | | | | | | | | |
| 700 | | | | | | | | | | | | | | | | |
| 750 | | | | | | | | | | | | | | | | |
| 800 | 12.9 | .224 | | | | | | | | | 13.3 | .232 | | | | |
| 850 | | | | | | | | | | | | | | | | |
| 900 | | | | | | | | | | | | | | | | |
| 950 | | | | | | | | | | | | | | | | |
| 1000 | 13.4 | .228 | | | | | | | | | 13.5 | .213 | | | | |
| 1200 | 13.8 | .240 | | | | | | | | | 14.2 | .236 | | | | |
| 1400 | 14.2 | .276 | | | | | | | | | 14.5 | .295 | | | | |
| 1600 | 14.8 | .291 | | | | | | | | | 15.4 | .252 | | | | |
| 1800 | 15.2 | .236 | | | | | | | | | 15.2 | .287 | | | | |
| 2000 | 15.9 | .256 | | | | | | | | | 15.2 | .315 | | | | |
| 2200 | 16.0 | .315 | | | | | | | | | 16.7 | .256 | | | | |
| 2400 | 16.6 | .339 | | | | | | | | | 16.9 | .268 | | | | |
| 2600 | 17.4 | .299 | | | | | | | | | 17.5 | .283 | | | | |
| 2800 | 17.9 | .327 | | | | | | | | | 17.9 | .276 | | | | |
| 3000 | 18.6 | .335 | | | | | | | | | 18.7 | .299 | | | | |

TABLE NO. 2

| # Welds | Test #9 I/KA | Test #9 WN | Test #10 I/KA | Test #10 WN | Test #11 I/KA | Test #11 WN | Test #12 I/KA | Test #12 WN | Test #13 I/KA | Test #13 WN | Test #14 I/KA | Test #14 WN | Test #15 I/KA | Test #15 WN | Test #16 I/KA | Test #16 WN |
|---|---|---|---|---|---|---|---|---|---|---|---|---|---|---|---|---|
| 0   | 12.1 | .236 | 12.1 | .220 | 12.0 | .177 | 11.6 | .224 | 12.1 | .213 | 11.0 | .213 | 10.9 | .236 | 10.6 | .181 |
| 50  | 12.3 | .220 | 12.3 | .276 | 12.4 | .217 | 11.7 | .201 | 12.3 | .295 | 11.6 | .205 | 11.7 | .193 | 11.0 | .157 |
| 100 | 12.4 | .201 |      |      | 12.2 | .220 | 12.1 |      |      |      | 11.9 | .201 | 12.3 | .177 | 10.9 | .142 |
| 150 | 12.6 | .197 |      |      |      |      |      |      |      |      | 12.4 | .213 | 12.5 | .197 | 11.1 | .165 |
| 200 | 12.8 | .193 |      |      |      |      |      |      |      |      | 12.5 | .228 | 12.8 | .197 | 10.9 | .157 |
| 250 | 12.7 | .209 |      |      |      |      |      |      |      |      | 12.6 | .197 | 13.1 | .213 | 11.1 | .130 |
| 300 | 12.7 | .193 |      |      |      |      |      |      |      |      | 12.6 | .157 | 13.3 | .228 | 11.3 | .165 |
| 350 |      |      |      |      |      |      |      |      |      |      |      |      |      |      | 11.5 | .181 |
| 400 |      |      |      |      |      |      |      |      |      |      |      |      |      |      | 11.5 | .142 |
| 450 |      |      |      |      |      |      |      |      |      |      |      |      |      |      | 11.4 | .154 |
| 500 |      |      |      |      |      |      |      |      |      |      |      |      |      |      | 11.7 | .165 |
| 550 |      |      |      |      |      |      |      |      |      |      |      |      |      |      | 11.8 | .181 |
| 600 |      |      |      |      |      |      |      |      |      |      |      |      |      |      | 11.8 | .154 |
| 650 |      |      |      |      |      |      |      |      |      |      |      |      |      |      | 11.7 | .150 |
| 700 |      |      |      |      |      |      |      |      |      |      |      |      |      |      | 11.7 | .177 |
| 750 |      |      |      |      |      |      |      |      |      |      |      |      |      |      | 11.4 | .185 |
| 800 |      |      |      |      |      |      |      |      |      |      |      |      |      |      | 12.0 | .193 |

In the tests of the foregoing tables, several remarks can be made. Test nos. 10 through 13 with a six inch radius were only tested for initial welds to provide data for this early portion of electrode life. In the various tests, data was taken at a selected weld number, and as the tables reflect, not every test had data taken on the same weld numbers. Accordingly, blanks appear in the tables where data was not taken. Note also, Test no. 1 experienced a good rate of current increase which was substantially linear from 0 welds to 3,000 welds, having an average rate of increase of about 235 amps per 100 welds. These tests are preliminary, and tests are ongoing.

As shown in FIGS. 5 and 6, there is a preferred envelope or range of stepped current increase in which the present invention provides generally consistent and substantially linear current stepper increases. Such envelope is shown on FIG. 5 and FIG. 6 with upper envelope 600 and lower envelope 700. Upper envelope 600 is plotted horizontally from 0 welds to 50 welds at an amperage level of 12,500 amps, and thereafter increases from 50 welds to 1500 welds linearly at a rate of increase of 250 amps per 100 welds. Lower envelope 700 is plotted as a horizontal line from 0 welds to 50 welds at a level of 11,000 amps. Thereafter, from 50 welds through 1500 welds lower envelope 700 increases at a linear rate of 200 amps per 100 welds. As shown, envelopes 600 and 700 end at about 1500 welds reflecting the range of current values during the early life of the electrode fall within such range without undue conditioning. However, the present invention provides for electrode life well beyond 1500 welds, providing cost effective electrodes which typically have a generally constant current stepping rate beyond 1500 welds.

Tests 1-16 were conducted without a coating on the weld tip face of the electrode. However, preliminary tests with a graphite coating, as described above, indicate particularly good results, at least out to 1000 welds and potentially beyond. The rate of current increase for graphite coated electrodes according to the present invention appear to be even less than the uncoated electrodes. Thus, the current schedule when plotted on a current-number of welds graph appears to have a flatter or smaller slope.

The initial 50 welds comprise an established threshold welding current suitable for production weld joints of the galvanized metal between about 11,000 and 12,500 amps. Accordingly, upper envelope 600 and lower envelope 700 define a generally linear path starting at the threshold current through which current profiles are plotted according to the present invention. Welding continues beyond 1500 welds until the electrodes fail. Tests of the present invention have had electrode life beyond four thousand welds before failure. The electrodes are replaced on the welder with other electrodes according to this invention which are new, rather than with old, refaced electrodes. Such a linear increase is advantageous in that it allows for welders to more predictably and with greater control increase their current steppers on their welding machines to track the optimal current schedule for the inventive electrode. Accordingly, electrode life is extended, resulting in cost savings. Particularly, such profile is used with the electrode structure of the present invention previously described. This unique combination affords welding operators significant advantages over the prior art. To take advantage of this substantially linear welding process, the operator provides a pair of electrodes, at least one according to the present invention and previously described on a known welding machine in the ordinary manner, such electrode preferably being made of a conventional copper alloy. The operator welds a series of weld joints by pressing the weld joints between a pair of resistance welding electrodes according to the present invention and passing current through the electrodes and through the weld joint according to a particular weld schedule. For the tests set forth above, this weld schedule for an initial 50 welds is established as a threshold current, between about 11,000 and 12,500 amps in the present embodiment, successively pressing the welding joint between the electrodes and passing such current therethrough for each weld. This threshold may vary according to variables such as the type of metal being welded, the presence and type of coatings on the metal, the specified nugget size and strength, and other such factors. However, in establishing the threshold current between an upper and a lower current, the upper amperage is defined as an amperage which is high enough to cause expulsion at the weld. The lower amperage is defined as an amperage which is too low to provide sufficient heat to form a weld of the specified nugget size or strength. As illustrated in FIG. 6 with test 16, the threshold current is established with the 50th weld at 11,000 amps for the illustrated threshold between 11,000 and 12,500 amps. Never-the-less, it is to be understood that envelope 600 and envelope 700 are merely examples suitable to encompass most of the tests illustrated herein, but each may be greater or lesser current values according to the definition for establishing a threshold current provided above. Thus, Test 16 does not fall within the range between envelopes 600 and 700 as illustrated while still being within the scope of the present invention.

For the next welds, weld no. 51 through weld no. 1500, the current is successively stepped up, or increased at a stepper increase rate between about 200 and 250 amps per 100 welds as shown by upper envelope 600 and lower envelope 700 in FIGS. 5 and 6. Thereafter, welding continues until the electrodes fail. Accordingly, substantially linear increase in amperage is provided with the present inventive process, providing benefits previously described. Typically, the metal welded is double-sided or single-sided zinc-coated, or galvanized steel such as hot dip, galvanealed, electrogalvanized, pure zinc, zinc-nickel, zinc-nickel under a thin organic coating, hot dip galvanealed, zincroplex, hot dip galvanized or Zincrometal, common to the automotive industry. Other coating on the steel may be used, such as for example tin, lead, terne plate, chromium, organic coatings, cadmium, and/or aluminum coatings may be used. Likewise, other metals may be welded such as titanium, nickel alloys, or other metals. Various combinations of coated and uncoated metals may be welded.

The inventive process may also include the steps of pressing the metal members together between a pair of resistance welding electrodes; and passing an electric current through the electrodes and through the metal members to weld the members together, where at least one of the electrodes comprises a resistance welding electrodes according to the present invention. At least one electrode, and possibly both electrodes are in contact with a zinc-coated or galvanized surface.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A resistance welding electrode, comprising:
an electrically conductive metal body having a base portion, means for cooling said body, and an integral nose portion projecting from said base portion an axial nose length and terminating in a welding tip face, wherein said nose portion tapers inwardly between said base portion and said welding tip face with a concave profile taper for self-dressing during welding, wherein said nose portion is axially offset from said base portion, and wherein said welding tip face is non-flat and fabricated to define a shape having a convex welding tip curvature, wherein said welding tip face has a face diameter, said face diameter and said welding tip curvature defining a crown height near the center of said welding tip face, wherein said crown height is less than about 0.003 inches so said shape of said welding tip face allows radial expulsion of waste material and wherein said welding tip face is shaped to avoid initial conditioning of the electrode.

2. The electrode of claim 1 wherein said nose portion of said body is made up of non-dispersion strengthened, essentially pure copper.

3. The electrode of claim 2 wherein said welding tip face has a face diameter, and wherein said nose portion has an axial nose length from said base to said welding tip face, said face diameter being about equal to said nose length.

4. The electrode of claim 3 wherein said concave profile taper of said nose portion defines a frustum of a vortical surface, and wherein said concave profile taper has a concave curvature of an arc of a circle.

5. The electrode of claim 1 wherein said welding tip face has a face diameter, and wherein said nose portion has an axial nose length from said base to said welding tip face, said face diameter being about equal to said nose length.

6. The electrode of claim 1 wherein said concave profile taper of said nose portion defines a frustum of a vortical surface, and wherein said concave profile taper has a concave curvature of an arc of a circle.

7. The electrode of claim 1 wherein said crown height is about 0.002 inches.

8. The electrode of claim 1 wherein said nose portion of said body is made up of a conventional, non-dispersion strenghtened copper material having copper combined with one or more metals selected from the group consisting of chromium, zirconium, cadmium, cobalt, nickel, beryllium, tungsten, aluminum, tungsten carbide, iron, and molybdenum.

9. A resistance welding electrode, comprising:
an electrically conductive metal body having a base portion, means for cooling said body, and an integral nose portion projecting from said base portion an axial nose length and terminating in a welding tip face, wherein said nose portion tapers inwardly between said base portion and said welding tip face with a concave profile taper, wherein said nose portion is axially offset from said base portion, and wherein said welding tip face is fabricated to define a convex welding tip curvature, wherein said welding tip face has a face diameter, said face diameter and said welding tip curvature defining a crown height near the center of said welding tip face, wherein said crown height ranges between about 0.0015 and 0.003 inches, wherein said nose portion of said body is made up of essentially pure copper, wherein said welding tip face has a face diameter, and wherein said nose portion has an axial nose length from said base to said welding tip face, said face diameter being about equal to said nose length, wherein said concave profile taper of said nose portion defines a frustum of a vortical surface, and wherein said concave profile taper has a concave curvature of an arc of a circle, and wherein said welding tip face has a thin coating of material for reducing initial weld sticking, said coating selected from the group comprising rhodium, zinc, graphite, titanium carbide, grease and carbon.

10. The electrode of claim 9 wherein said crown height is about 0.002 inches.

11. A resistance welding electrode, comprising:
an electrically conductive metal body having a base portion, means for cooling said body, and an integral nose portion projecting from said base portion an axial nose length and terminating in a welding tip face, wherein said nose portion tapers inwardly between said base portion and said welding tip face with a concave profile taper, wherein said nose portion is axially offset from said base portion, and wherein said welding tip face is fabricated to define a convex welding tip curvature, wherein said welding tip face has a face diameter, said face diameter and said welding tip curvature defining a crown height near the center of said welding tip face, wherein said crown height ranges between about 0.0015 and 0.003 inches, and wherein said welding tip face has a thin coating of material for reducing initial weld sticking, said coating selected from the group comprising rhodium, zinc, graphite, titanium carbide, grease and carbon.

12. A process for welding metal members together, comprising the steps of:
pressing the metal members together between a pair of resistance welding electrodes; and
passing an electric current through said electrodes and through said metal members to weld the members together, at least one of said electrodes comprising an electrically conductive metal body having a base portion, means for cooling said body, and an integral nose portion projecting from said base portion an axial nose length and terminating in a welding tip face, wherein said nose portion tapers inwardly between said base portion and said welding tip face with a concave profile taper for self-dressing during welding, wherein said nose portion is axially offset from said base portion, and wherein said welding tip face is non-flat and fabricated to define a shape having a convex welding tip curvature, wherein said welding tip face has a face diameter, said face diameter and said welding tip curvature defining a crown height near the center of said welding tip face, wherein said crown height is less than about 0.003 inches so said shape of said welding tip face allows radial expulsion of waste material and wherein said welding tip face is shaped to avoid initial conditioning of the electrode.

13. The process of claim 12 wherein said nose portion of said body is made up of non-dispersion strenghtened, essentially pure copper.

14. The process of claim 13 wherein at least one of said metal members is coated with a coating.

15. The process of claim 14 wherein said coating is aluminum.

16. The process of claim 14 wherein said coating includes zinc.

17. The process of claim 13 wherein at least one of said metal members is selected from a group consisting of aluminum and aluminum alloy.

18. The process of claim 12 wherein said conventional copper material comprises a non-dispersion strengthened alloy of between about 0.6% and 1.2% chromium, the balance essentially copper.

19. A process for welding metal members together, comprising the steps of:
pressing the metal members together between a pair of resistance welding electrodes; and
passing an electric current through said electrodes and through said metal members to weld the members together, at least one of said electrodes comprising an electrically conductive metal body having a base portion, means for cooling said body, and an integral nose portion projecting from said base portion an axial nose length and terminating in a welding tip face, wherein said nose portion tapers inwardly between said base portion and welding tip face with a concave profile taper, wherein said nose portion is axially offset from said base portion, and wherein said welding tip face is fabricated to define a convex welding tip curvature, wherein said welding tip face has a face diameter, said face diameter and said welding tip curvature defining a crown height near the center of said welding tip face, wherein said crown height ranges between about 0.0015 and 0.003 inches, wherein said welding tip face has a thin coating of material for reducing initial weld sticking, said coating selected from the group comprising rhodium, zinc, graphite, titanium carbide, grease and carbon.

20. A process for welding metal members together, comprising the steps of:
pressing the metal members together between a pair of resistance welding electrodes; and
passing an electric current through said electrodes and through said metal members to weld the members together, at least one of said electrodes comprising an electrically conductive metal body having a base portion, means for cooling said body, and an integral nose portion projecting from said base portion an axial nose length and terminating in a welding tip face, wherein said nose portion of said body is made up of essentially pure copper, wherein said nose portion tapers inwardly between said base portion and said welding tip face with a concave profile taper for self-dressing during welding, and wherein said welding tip face is non-flat and fabricated to define a convex welding tip curvature, wherein said welding tip face has a face diameter, said face diameter and said welding tip curvature defining a shape of said welding tip face which allows radial expulsion of waste material and wherein said welding tip face is shaped to avoid initial conditioning of the electrode.

21. The process of claim 20 wherein said crown height is about 0.002 inches.

22. The process of claim 20 wherein at least one of said metal members is selected from a group consisting of aluminum and aluminum alloy.

23. The process of claim 20 wherein at least one of said metal members is coated with a coating.

24. The process of claim 23 wherein said coating is aluminum.

25. The process of claim 23 wherein said coating includes zinc.

26. A resistance welding electrode, comprising:
an electrically conductive metal body having a base portion, means for cooling said body, and an integral nose portion projecting from said base portion an axial nose length and terminating in a welding tip face, wherein said nose portion tapers inwardly between said base portion and said welding tip face with a concave profile taper for self-dressing during welding, and wherein said welding tip face is non-flat and fabricated to define a convex welding tip curvature, wherein said welding tip face has a face diameter, said face diameter and said welding tip curvature defining a shape of said welding tip face which allows radial expulsion of waste material and wherein said welding tip face is shaped to avoid initial conditioning of the electrode, wherein said nose portion of said body is made up of non-dispersion strengthened essentially pure copper.

* * * * *